United States Patent
Walters et al.

[19]

[11] Patent Number: 5,958,166
[45] Date of Patent: Sep. 28, 1999

[54] METHOD FOR REPAIRING HIGH TEMPERATURE COMPOSITE STRUCTURES

[75] Inventors: Kevin D. Walters, St. Charles, Mo.; Gregory P. Nowak, Belleville, Ill.

[73] Assignee: McDonnell Douglas Corporation, St. Louis, Mo.

[21] Appl. No.: 08/881,997

[22] Filed: Dec. 31, 1996

[51] Int. Cl.⁶ .................................................. B32B 35/00
[52] U.S. Cl. ...................... 156/94; 29/402.09; 29/402.11; 156/98; 428/63
[58] Field of Search ................................ 156/94, 98, 285; 29/402.09, 402.11; 428/63

[56] References Cited

U.S. PATENT DOCUMENTS

| | | | |
|---|---|---|---|
| 4,352,707 | 10/1982 | Wengler | 156/94 |
| 4,517,038 | 5/1985 | Milles | 29/402.11 |
| 4,554,036 | 11/1985 | Newsom | 156/94 |
| 4,668,317 | 5/1987 | Snyder | 156/98 |
| 4,808,253 | 2/1989 | Mimbs | 156/98 |
| 4,978,404 | 12/1990 | Westerman | 156/98 |
| 5,023,987 | 6/1991 | Wuepper | 156/98 |
| 5,034,254 | 7/1991 | Cologna | 156/98 |
| 5,116,216 | 5/1992 | Cochran et al. | 428/304 |
| 5,236,646 | 8/1993 | Cochran et al. | 264/102 |

OTHER PUBLICATIONS

"Repair of Composites", Klein, Allen J., *Advanced Composites*, Jul./Aug. 1987, pp. 50–62

*Primary Examiner*—Daniel Stemmer
*Attorney, Agent, or Firm*—Bryan Cave LLP

[57] ABSTRACT

A method for repairing a high temperature composite structure fabricated from layers of composite plies. If the composite structure contains an internal high temperature core, the core is first restored by installing a core block into the damaged region, bonding the core block in place by applying high temperature material resin and uncured foam material into the region between the core block and the damaged region, and partially curing the core block. A number of repair plies, formed from pre-impregnated composite material or formed using dry cloth manually impregnated with high temperature resin are prepared. The repair plies are sized and shaped using a series of templates corresponding to the damaged region. The installed plies are cured using high temperature localized heating of the damaged region without impairing the surrounding structure.

19 Claims, 5 Drawing Sheets

FIG. 6

METHOD FOR REPAIRING HIGH TEMPERATURE COMPOSITE STRUCTURES

FIELD OF THE INVENTION

The present invention relates generally to high temperature composite structures and, more particularly, to methods for repairing damaged high temperature composite structures.

BACKGROUND OF THE INVENTION

The use of composite structures for various components of modern aircraft is expanding. Increasingly, large portions of an aircraft's structure may be manufactured from composite material, including wings and fuselage skins, certain substructures, aerodynamic surfaces, and engine/exhaust components. The benefits of using composite structures include high strength to weight ratio, corrosion resistance, thermal stability, and long fatigue life. In a number of applications it is desirable for certain composite structures that are subjected to continuous or transient operating conditions in the temperature range of between 550–750° F. to be fabricated from so-called high temperature materials. Such high temperature materials are preferable in engine or exhaust structural or fairing components used in commercial and military aircraft and missiles, and aerodynamically heated components of supersonic aircraft. Additional applications for high temperature materials include high temperature exhaust impinged components such as wing flaps on certain aircraft, engine areas of spacecraft, solar-heated components, or any exhaust-washed structural component.

Typically, these composite structures, especially when used on edge components, are susceptible to small area damage during operational use from items such as stones, hail, or shrapnel. Additionally, damage may occur from maintenance workstands and dropped tools while the aircraft is undergoing maintenance activities. A continuing desire of those skilled in the art is to develop methods to repair the composite structures to conform both structurally and electrically to the originally fabricated component.

Although repair processes for more common low temperature composite components are widely available (such as for 250° F. epoxies, 350° F. bismaleimides, and 550° F. polyimides), many of these techniques suffer from significant disadvantages and are not easily applicable to higher temperature composites. For example, because of the high temperatures required to cure the composite materials, damage may occur to the portion of the structure surrounding the repair area during the long, high temperature cure cycle typically required for high temperature materials. The alternative method of using localized heating (for example, a heating blanket) generally requires the use of applied pressure, such as by using a vacuum bag. However, there are concerns of survivability of bagging materials in high temperature, potentially oxidative environments. Traditional breather/release films are glass type materials coated with TEFLON® polymer and are known to decompose in oxidative environments above 650° F. Also, chemical release agents, such as, for example, FREKOTE® 33 or 44 (available from Dexter Corporation, Seabrook, N.H.) are limited to temperatures of 700° F. In addition, bagging films such as KAPTON® (manufactured by DuPont), UPILEX®, and other polyimide-based films are generally restricted to 700° F. Heat blankets typically overlap undamaged adjacent structure, which can cause collateral damage during the cure process. Another difficulty encountered in repairing composite structures is the need to consistently and accurately position the repair plies to ensure the structural and electrical integrity of the repaired component.

Accordingly, there is a continuing need for a method to repair high temperature organic matrix composite structures. Such a method could desirably repair both the structural and electrical integrity of the original structure. Ideal repair processes for such high temperature composites would have certain characteristics including, a reduction in the total repair time minimizing the use of special support equipment, the amount of consumable products used, and the amount of repair material used. Additionally, the method would prevent disruption of the structural integrity of the repaired component, ensure electrical compatibility of the repaired section to the parent structure, and would incorporate simple procedures thereby decreasing the skill requirements needed for the repair technician.

In order to fulfill these requirements, the method of the present invention uses a combination of unique repair preparation techniques, repair material processing methods, high temperature curing equipment applications, and high temperature vacuum bagging processes, to accommodate the high cure temperature and long cure cycle of high temperature materials. Additionally, the unique repair processes disclosed herein integrate multiple methods for restoring both structural and electrically absorptive properties.

SUMMARY OF THE INVENTION

In accordance with the method of the present invention, a damaged composite structure fabricated from a high temperature material having an internal high temperature core and a skin surface fabricated from layers of composite plies may be repaired. A number of repair plies corresponding to the original composite plies of the component are prepared for installation. The repair plies may be formed from pre-impregnated composite material or may be formed using dry cloth manually impregnated with high temperature resin using a wet layup process. When using the wet layup process, the repair plies may be partially cured before they are installed. If the original component includes a resistivity layer(s), the repair plies may also include electrically compatible resistivity plies for repairing the electrical integrity of the component.

The repair plies are sized and shaped using a series of templates corresponding to the size and shape of the damaged region under repair. These same templates are also used to position and, if necessary, orient, the plies during installation.

If the composite structure contains an internal high temperature core, the core is first restored by installing a core block into the damaged region, bonding the core block in place by applying high temperature material resin and uncured foam material into the region between the core block and the damaged region, and partially curing the core block. The repair plies are then installed, using the templates for positioning and orienting, thereby repairing the structural, and, if resistivity plies are used, electrical, integrity of the composite component. The repair plies are then cured to 700° F., followed by a post-cure cycle at 750° F.

The present invention further provides a method for curing the repaired component using a unique curing process that permits high temperature localized heating of the damaged region without impairing the surrounding structure. The method includes using porous and non-porous release materials placed over the damaged region of the composite component with the repair plies installed, a caul sheet placed over the release materials for ensuring a smooth surface finish, and a heating blanket placed over the caul sheet for heating the repair plies. Pressure is added to the heating environment by securing a high temperature vacuum bag material over the heating blanket with a layer of insulation placed between the vacuum bag material and the blanket.

The present invention also provides a unique heating cycle, which, when the repair plies comprise dry cloth manually impregnated with high temperature resin plies, includes heating the damaged region with the repair plies installed therein for about two hour intervals at temperatures of about 150° F., 180° F., and 200° F., then increasing the heat to 550° F. for about 30 minutes, increasing the heat to a temperature of about 700° F. for about four hours and, finally, increasing the heat to a temperature of about 750° F. for about another eight hours. Repairs using pre-impregnated materials may follow a similar cure cycle with the substitution of a 430° F. three-hour hold in place of the 550° F. hold.

BRIEF DESCRIPTION OF THE DRAWINGS

These and other features, aspects, and advantages of the present invention will become better understood with regard to the following description, appended claims, and accompanying drawings wherein:

DETAILED DESCRIPTION OF THE INVENTION

Figure 1:
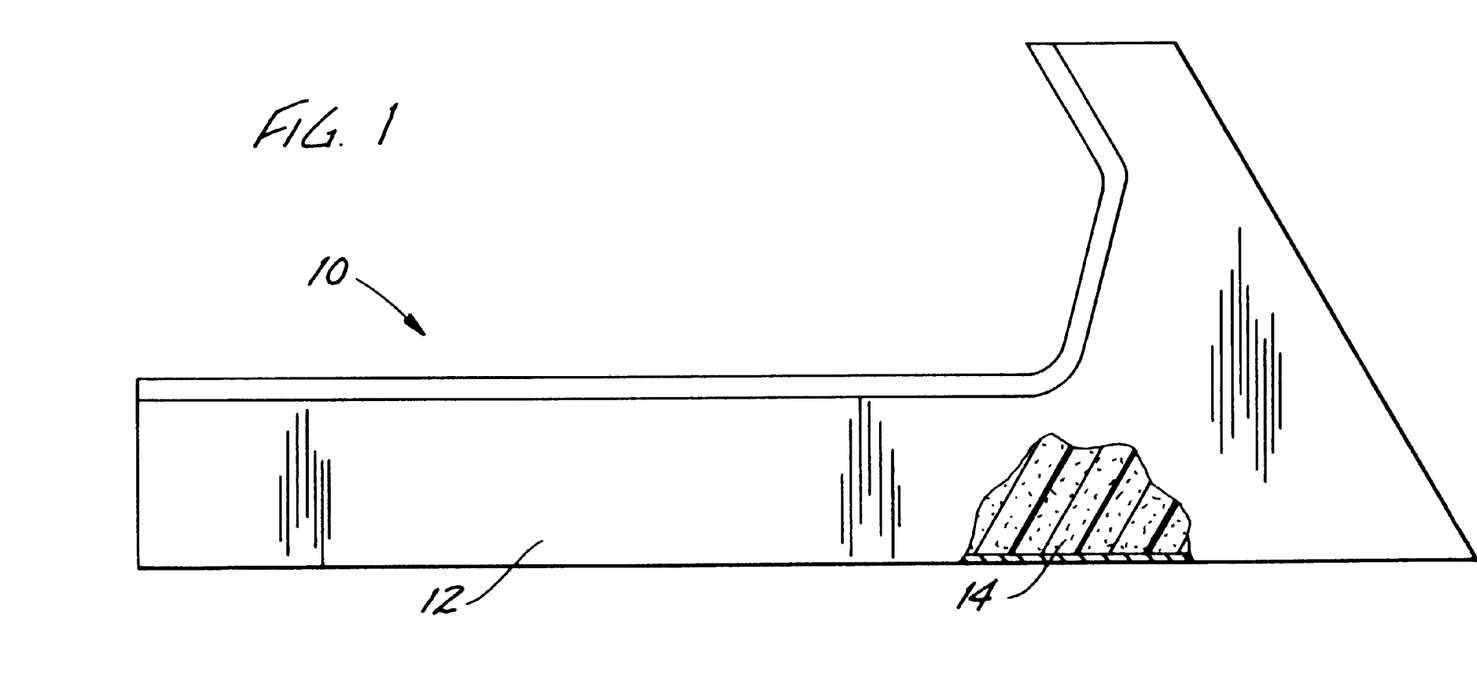
FIG. 1 is a fragmentary cross-sectional view of a high temperature edge component used to illustrate the preferred method of the present invention.

The preferred method of the present invention provides a process to repair high temperature composite structures, such as the AFR-700B edge component 10 of an advanced fighter aircraft concept, as shown in FIG. 1. The structures may be fabricated as a solid laminate component or, alternatively, as shown in FIG. 1, they may comprise a skin surface surrounding core materials, such as high temperature foam or honeycomb. For purposes of illustration, edge component 10 of FIG. 1 includes a high temperature skin surface 12 and a high temperature internal foam core 14. The components may be fabricated using any high temperature material, such as AFR-700B or similar resin systems. As is known, AFR-700B is a high use temperature (700° F.) organic matrix composite resin system used in fabrication of composite structures.

The preferred method comprises, as its principal steps, preparing the repair area, preparing templates for measuring, positioning, and aligning the repair plies, restoring the core region of the structure, fabricating, installing and partially curing all repair plies, and curing some or all of the repaired area.

Figure 2:
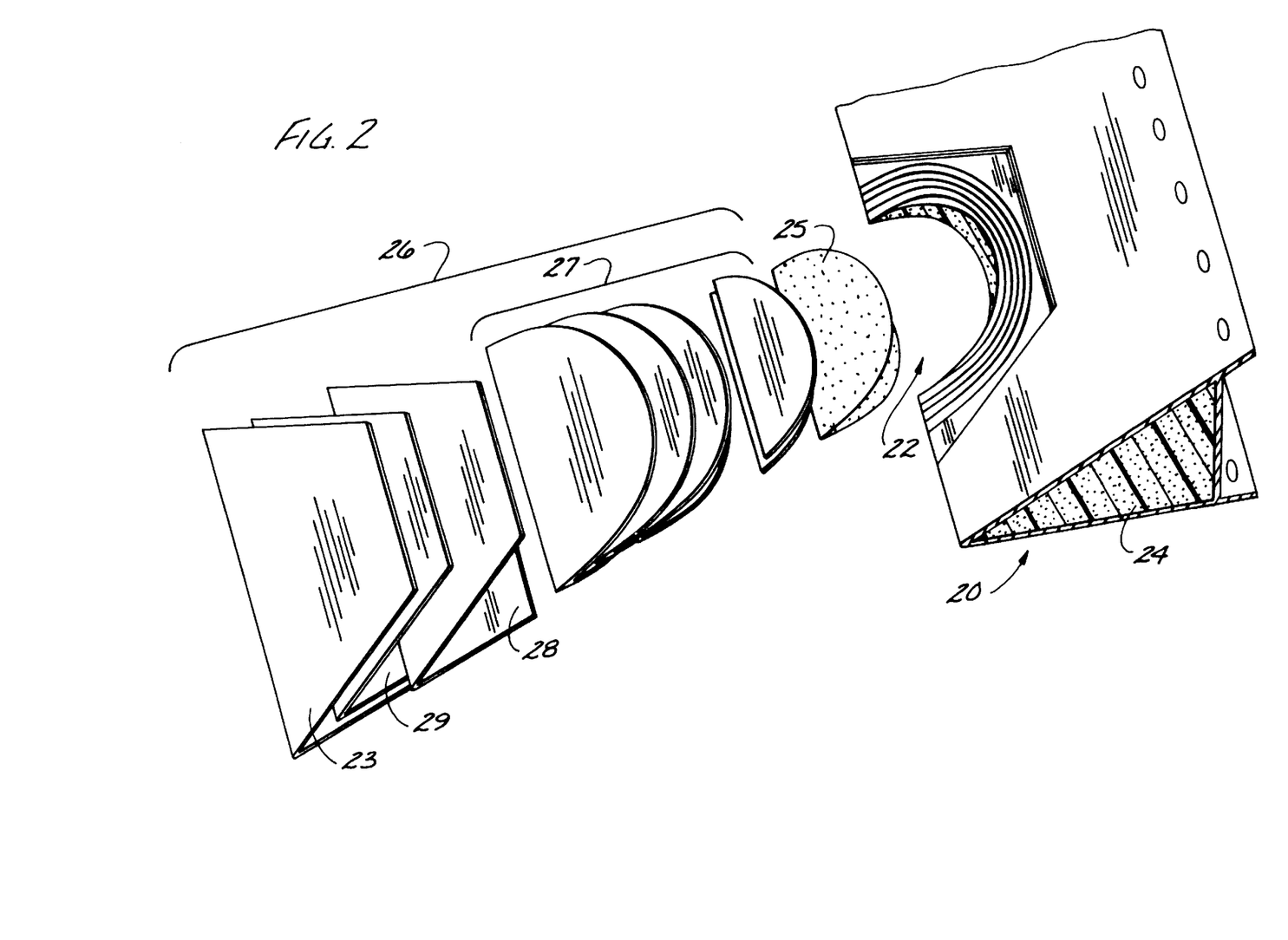
FIG. 2 is an exploded cross-sectional view of a damaged high temperature structure showing the various layers of repair plies.
Figure 3:
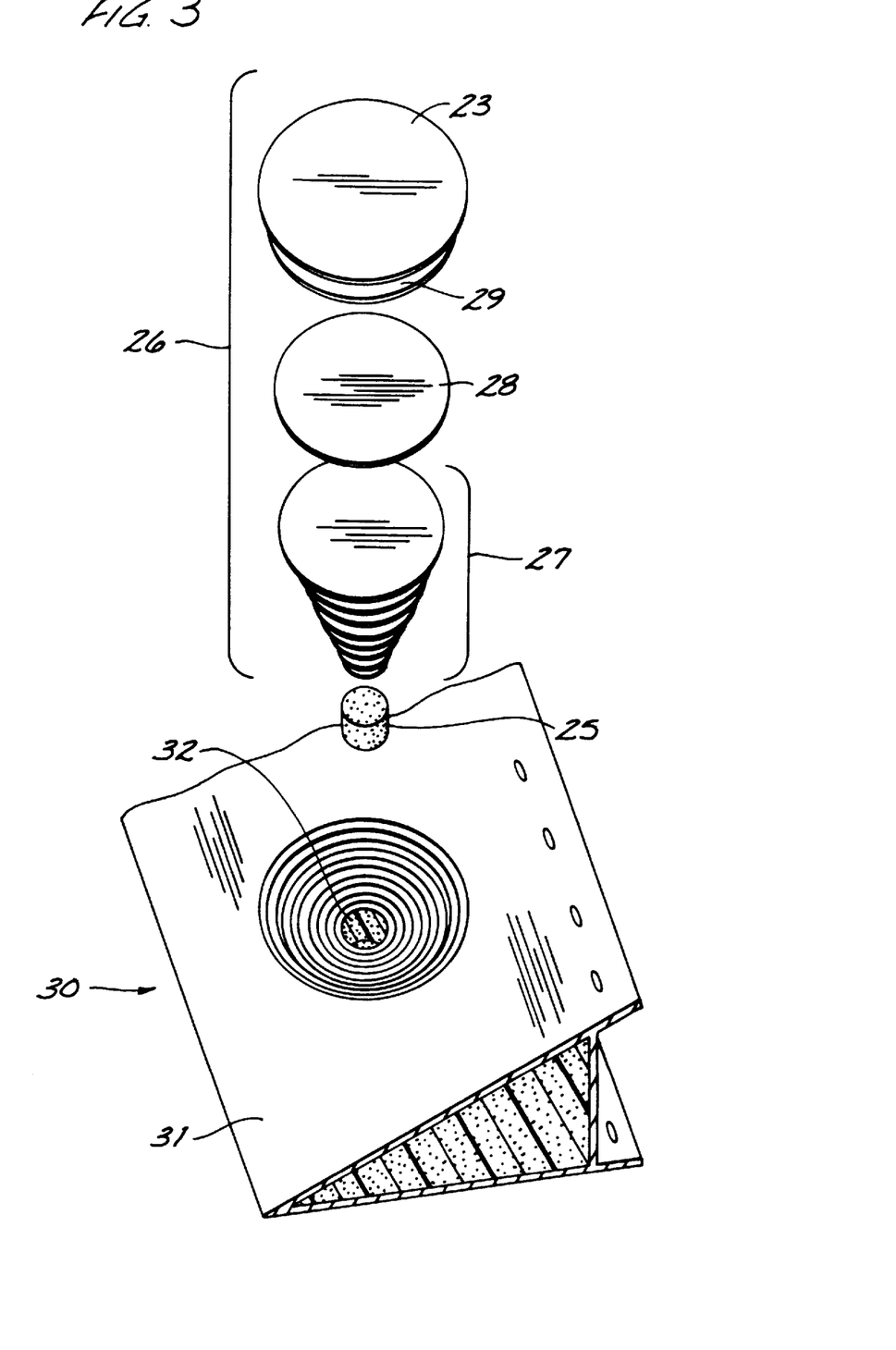
FIG. 3 is an exploded cross-sectional view of another damaged region of a high temperature structure, along with its layers of repair plies.

As an example, FIG. 2 shows an edge component 20, fabricated from AFR-700B or similar high temperature resin, having a damaged region 22 therein. The representative edge component 20 has an internal core 24, fabricated from a high temperature foam material, surrounded by several layers of inner composite plies, a two-piece resistivity ply 28, and one outerwrap ply layer 29. A second outer ply 23 is added to increase the strength of the repair. Edge component 20 is shown with damage region 22 as a portion of the edge component 20 removed from its leading edge. As another example, FIG. 3 shown a similar edge component 30, having a damaged region 32 in the upper surface 31 therein. Edge component 30 has eight inner plies 27, resistivity ply 28, and one outerwrap ply 29. A second outerwrap ply 23 is added to the repair to increase strength. The method of the present invention is useful with such composite structures having the illustrated damaged regions, as well as any other structure fabricated from high temperature materials having damaged regions therein.

If necessary, the initial step of the method of the present invention is to prepare the damaged region 22 of the high temperature composite structure for repair. Preferably, the damaged region 22 is prepared using conventional procedures such as, for example, grinding, sanding or trimming methods.

The next step in the preferred method is to restore the high temperature core material using one of two preferred methods. In a first method, a precured high temperature foam material core block 25 is prepared by, for example, machining or hand-sanding to size a precured foam core block 25 to fit the damaged region 22. The core block 25 is preferably slightly larger in thickness and height than the damaged core region, so that, after bonding the block in place, the excess core may be sanded away to ensure an optimal fit. The core block 25 is then bonded in place by brush-applying high temperature material resin (used as an adhesive) and pack-in-place uncured foam material into the bondline.

Alternatively, if tooling or repair geometry provide a method for supporting the foam during packing and curing, the foam core may be restored by using resin and uncured foam without the precured core block 25. In this method, tooling in the form of flat metal sheets are fixtured (using clamps, etc.) around the damage. Preferably, resin is then painted onto the repair area interfaces. Uncured foam is packed against the core interface and fills the tooled region. The foam is cured in place (or partially cured as described later) and the fixturing is then removed. Preferably, hand sanding is used to produce the final net desired shape.

After the foam core is restored, a curing step is performed to cure the core block 25 into place. It has been determined that a partial curing step is preferred because partial curing is adequate to structurally support the outer skin restoration in the remaining repair steps. Additionally, the partial curing step can be performed using conventional heat blankets with temperature settings of less than 500° F. Moreover, the partial cure only requires ten hours, rather than the full 24-hour cure cycle.

The preferred resin for use in bonding the foam core in place may now be described. A base high temperature resin, such as AFR-700B, is diluted in situ with a low boiling point alcohol, such as methanol, and/or is blended with NMP (n-methyl-2-pyrrolidinone) at a ratio of 8:1. Preferably, the resin solution is used at 50% wt. to develop an adhesive film upon application.

It is generally known in polymide chemistry that amicacid reactions occur in the oligomer at or around 250° F. At this point, the viscosity of the resin starts to rise and become intractable, thus it is wise to do some initial processing (consolidation of the repair material) below this point where the viscosity is still dropping. In addition, it has been found through experimentation that partially advancing the resin, or "B-staging", should occur at temperatures of around 190° F. for about two hours. At this point in the cycle, more than half, but less than 90 percent of the solvent(s) added to the resin are driven off, which is also important in fabricating a void-free laminate. However, all of the solvents should not be driven off, because some level of remaining solvents is essential for encouraging imidization to occur.

Once the low temperature holds are complete, it is desirable to initiate the imidization reaction to occur. This enables the foam core to be strong enough to be used later as a tooling mandrel. The imidization of most polyimides is between 425° F. and 480° F. For this high temperature core material, the imidization occurs at about 430° F. It is also at this point where the second viscosity drop occurs. In traditional autoclave applications, the hold would be for one hour, followed by the insertion of 200 psi of pressure for consolidation. For the present application, a hold at 430° F. for three hours was found to be adequate to encourage imidization of the resin to occur and provide sufficient "green" strength, so that the material can now be used as a flyaway tooling mandrel for patch consolidation.

After the core plug 25 is sufficiently hardened in place, the repair plies 26 may be installed and cured. The repair plies 26 may be supplied as pre-impregnated from the material manufacturer, or may be supplied as a dry cloth, such as dry quartz fabric, and manually impregnated (commonly referred to as a "wet layup") using a high temperature resin thinned, for example, with 75% wt. methanol. Alternatively, precured trim-to-fit patches may be used, although such patches are not recommended for high temperature composite repairs because they typically delaminate or otherwise degrade during the high temperature bond-in-place cure cycle.

The geometries of the repair plies 26 as shown in FIG. 2 may vary according to the damaged area under repair. For example, inner plies 27 may be circular in shape, while the resistivity plies 28 and outerwrap plies 29 and 23 may be hexagonal in order to optimally restore electrical performance. Preferably, the structural repair plies 26 will be shaped to overlap the ply in which it is intended to structurally restore. The resistivity ply 28 is preferably restored with a nearly exact butt joint, with a slight gap or overlap acceptable.

An important step in the repair process is the ability to accurately reproduce the size, shape, and orientation of the repair plies 26. To accommodate this preferred requirement, the method of the present invention includes the preparation of a series of transparent templates onto which the repair ply geometries are traced. Preferably, the templates comprise transparent, mylar templates and one template is created for each layer of repair ply. Each template is created by placing a mylar sheet over the damaged region and tracing the edge of the ply it is intended to restore. Alignment marks applied to the part are duplicated onto the template to allow proper positioning of the template and repair plies. The matched templates allow for accurate placement of the repair plies, thereby ensuring the structural and electrical integrity of the repaired region.

The template may be used in one of two preferred ways to accurately place individual repair plies. The template may be used to trim out a pre-impregnated repair ply. Alternatively, the template may be used to size a wet layup whereby high temperature resin, such as AFR-700B, is impregnated into a dry cloth.

Wet layup repair plies can be installed in either their wet impregnated form, or partially cured in a manner similar to the foam. As previously described, this "B-staging" should preferably occur around 190° F. Therefore the preferred method is to partially cure the wet layup plies at temperature dwells of about 150° F., 180° F., and 200° F. for two hours each.

When pre-impregnated plies are used in lieu of wet layups, they are preferably trimmed and placed in the same manner as the wet layups using templates. When the pre-impregnated plies wrap the tight radius of the edge component, a heat gun may be used to soften them to improve formability.

In certain applications, a resistivity ply 28 is incorporated into the structure. Such a resistivity ply 28 allows for certain electrical properties to be inherent in the structure for improved survivability from lightening strikes or other electrically/electronically generated threats. Preferably, the position of the resistivity repair ply 28 is defined using an RF probe. Using an RF probe, the taper of the resistivity across both the repair region 22 and the dry resistivity repair cloth is measured. The electrical taper between the repair region 22 and the repair cloth may preferably be matched to ensure the electrical integrity of the repaired structural component by trimming the resistivity repair cloth so as to match the taper of the repair region 22.

When wet laying up the resistivity ply, a curing step, whereby the ply is partially cured to about 200° F., is applied to harden it before placement into the laminate structure. The partial cure step removes most of the solvents remaining in the ply and prevents distortion of the wet layup ply due to handling. This partial cure process is the same as described for the wet layup structural repair plies and may preferably be accomplished using a heat blanket and vacuum bag for solvent removal. Preferably, the partial cure cycle is optimized to minimize both the porosity in the laminate structure and the time to perform the partial cure. As earlier described, it has been found that partially curing or B-staging the resin at a temperature of about 190° F. will aid in both ply consolidation as well as in minimizing volatile content. Thus, it is preferable to control the heat to about 200° F. to encourage the resin viscosity to drop, which, in turn, will increase by consolidation.

Figure 4:
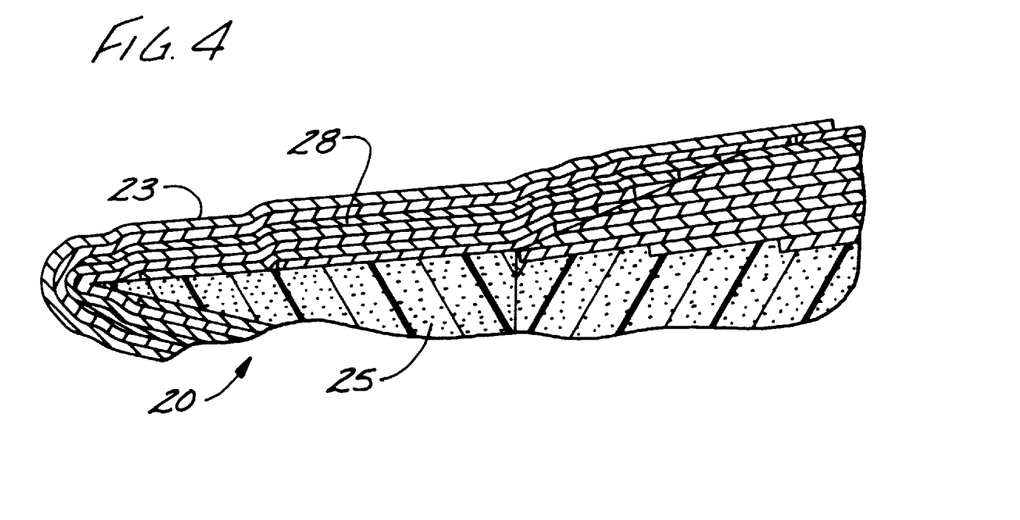
FIG. 4 is a cross-sectional view of the damaged region of the structure of FIG. 2 after the repair plies have been installed.
Figure 5:
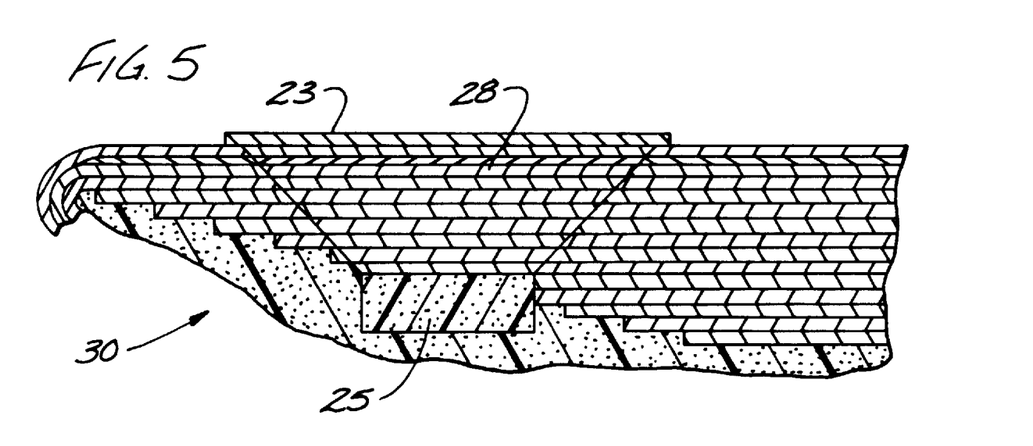
FIG. 5 is a cross-sectional view of the damaged region of the structure of FIG. 3 after the repair plies have been installed.

To install the repair plies, a high temperature resin, such as AFR-700B thinned by 75% by weight with methanol is brush applied onto the outer skin bonding surfaces as an adhesive. The resin adhesive assists in the bonding of the repair plies. However, the previously described high-temperature resin solution used to bond the foam core in place may preferably be used to bond the core to the initial inner repair ply. The templates previously designed and used to trim the repair plies are then placed over the repair region to assist in proper placement of each of the repair plies 26. The trimmed repair plies are incrementally placed in proper sequence into the repair region. Thus, the inner repair plies 27 are placed in sequence followed by, if necessary, resistive plies 28, followed lastly by outerwrap plies 29 and 23. A cross-sectional view of the edge components, with all repair plies installed, are shown in FIGS. 4 and 5.

Finally the repaired region must be properly cured. Preferably, the repaired region is cured using heat blanket processing because such processing allows the heating to be limited to the repair region, rather than subjecting the entire assembly to potentially damaging post-cure high temperatures of 750° F. or more for long periods of time. The preferred pressure method incorporates applying a vacuum bag over the repair region. In the region of the heat blanket, the vacuum bag is fabricated using a high temperature window of vacuum bag material. Insulating layers are installed between the blanket and the vacuum bag material.

Figure 6:
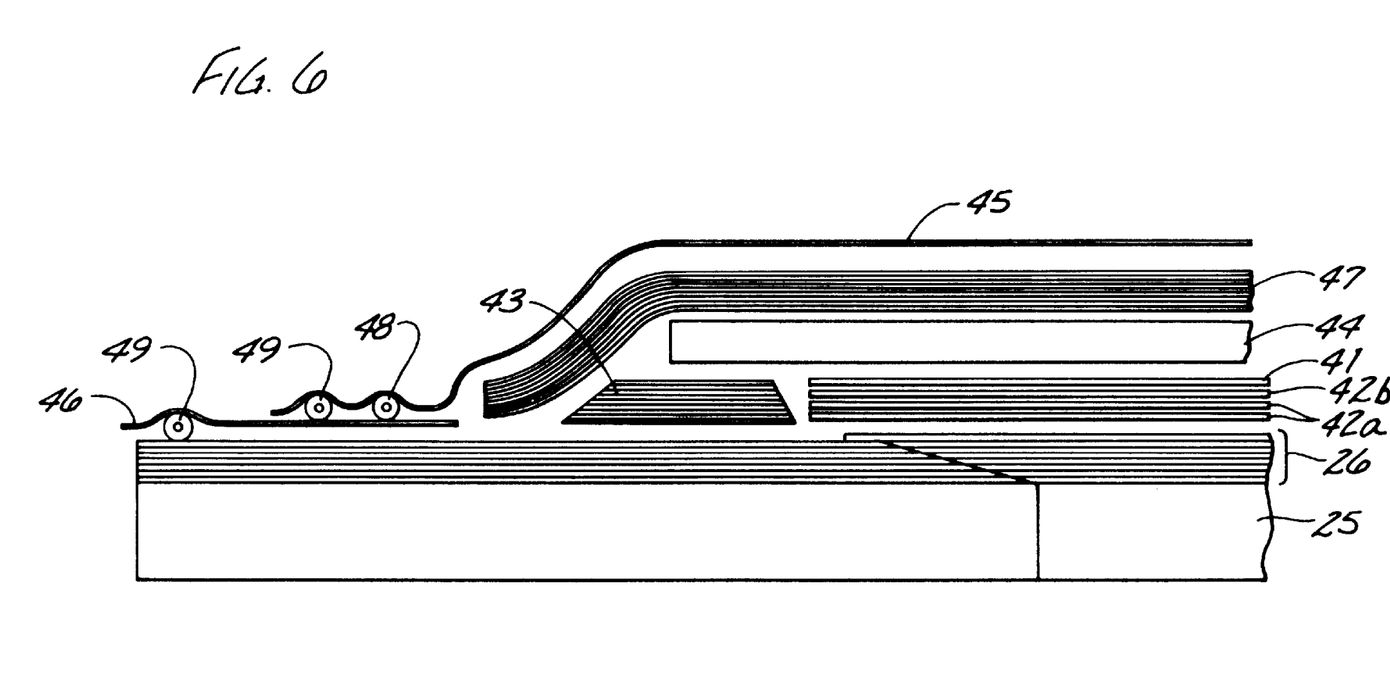
FIG. 6 is a cross-sectional view showing the preferred curing method of the present invention.

Referring to FIG. 6, in order to ensure even heat distribution during the curing step and to ensure a smooth surface finish in the repair region, a caul sheet 41 is preferably applied under the heating blanket 44 and over the repair plies 26. Preferably, the caul sheet material 41 is selected to prevent a chemical reaction with constituents in the high temperature material system. For example, if using AFR-700B as the high temperature material, a preferred material for the caul sheet 41 is thin (i.e., about 0.020 inches in thickness) aluminum. While other caul sheet material such as copper or steel may be used, these other materials tend to react with certain high temperature materials and deteriorate the quality of the repaired region. Preferably, the caul sheet 41 is slightly larger, such as one-half inch, than the largest repair ply.

Preferably, a set of release materials 42 are used to prevent the caul sheet 41 from adhering to the repair plies and, at the same time, provides an adequate medium to release the caul sheet 41 and extraneous bagging materials from the repair plies, and provide a sufficient breather path for volatiles and air to escape during resin advancement and curing. The release materials 42 are selected to survive the high cure temperature. Therefore, preferably, the release materials are spray coated with FREKOTE® 44, to create a thin porous release layer. Preferably the release materials comprise one or two plies of TEFLON®-coated fabric, such as CHR3TLL porous release 42a, manufactured by CHR Industries, against the outer repair ply, followed by one nonporous perforated (i.e., with holes punctured every one or two inches) release ply 42b, of KAPTON® film. The combination of release materials (both liquid and film/fabric), which may not normally withstand high temperatures alone, are sufficient to facilitate release and breathing when used together.

One common problem encountered when using heat blankets is that typical heat blankets are not provided in exact shapes and sizes to conform to each repair region. Therefore, oversized blankets are typically used to completely cover the repair area. However, this results in subjecting areas of the structure adjacent to the repair region to damaging heat, potentially resulting in skin delaminations or disbonds. To prevent this, as shown in FIG. 6, layers of insulation 43, such as between ten and twenty layers of heavy, style 7500, fiberglass cloth, may preferably be placed between the heat blanket 44 and portions of the structure adjacent to the repair area.

Preferably, consolidation pressure is applied during the cure cycle. Such pressure may be applied, for example, by using a vacuum bag that wraps over the heat blanket 44. However, conventional vacuum bags are prone to deterioration at temperatures exceeding 700° F. Although the vacuum bag in the vicinity of the heat blanket must use a material capable of withstanding excessive high temperatures, the vacuum bag may, preferably, use other materials in the lower temperatures regions away from the heat blanket. For example, nylon is the preferred choice in the low temperatures (i.e., less than 400° F.) away from the heat blanket because nylon is easier to seal, nylon is easier to stretch over tight radii areas, and nylon is less prone to tearing.

However, another material must be used for the vacuum bag in areas adjacent to the heat blanket. One such material, capable of withstanding temperatures of up to 700° F. is a polyimide-based film of KAPTON®. However, typically, KAPTON® material can only be used to about 700° F. for short duration, usually less than four hours. Alternatives have been suggested to overcome this deficiency. For example, a nitrogen bubble may be introduced over the vacuum bag made from KAPTON® vacuum bag material, to prevent oxidation of the material. Although this technique is helpful in preventing oxidation of the material, it adds complexity to the procedures and equipment used to repair high temperature materials.

Preferably, a method to protect the vacuum bag from the high temperatures generated by the heat blanket 44 without elaborate equipment is used. For example, layers of insulation 47, such as another ten to twenty-five layers of Style 7500 fiberglass insulation may be placed between the heat blanket 44 and the vacuum bag. Additionally, if the outer surface of the vacuum bag is exposed to ambient air temperature, the temperature of the vacuum bag is decreased, thus increasing its useful life.

Thus, the preferred configuration for the vacuum bag material is nylon 46 in areas away from the excessive heat of the heat blanket with a spliced window of KAPTON® vacuum bag material 45 over the heat blanket region. To ensure that the vacuum bag is properly sealed at the splice region between the nylon vacuum bag material 46 and the KAPTON® vacuum bag material 45, a row of high temperature sealant tape 48 is applied nearest the heat blanket 44 and a row of low temperature sealant tape 49 is placed further away from the heat blanket 44. Thus, through the unique placement of insulation in conjunction with ambient cooling, short-term 700° F. vacuum bag materials may be used in a method requiring high temperatures (i.e., 750° F.) for extended periods of time.

Typically, production processing of high temperature materials, such as AFR-700B, requires a 24-hour cure cycle, followed by a 56-hour free-standing (i.e., without external pressure) post-cure cycle. However, by subjecting the repair region and the surrounding structure to such lengthy cure cycles, the region and structure are prone to damage. Additionally, the typical cure cycles significantly impact repair time, manpower requirements, and the downtime of the aircraft. Preferably, the total repair time is reduced to under 24 hours by optimizing and combining a series of cure and post-cure cycles. Different cycles may be used for repairs incorporating wet layup skin plies or pre-impregnated materials. Additionally, as is known, the particular pressure and temperature cure cycles will vary depending on the combination of materials used and the amount of damage to be repaired. The cycles described below were tailored for use with AFR-700B as the skin material and foam core material.

For repairs using wet layup skin plies, the preferred cycle incorporates a cure cycle, using vacuum pressure only, of two-hour temperature cycle holds at temperatures of 150° F., 180° F., and 200° F., followed by a 30-minute temperature hold at 550° F., a four-hour temperature hold at 700° F., and an eight-hour temperature hold at 750° F. Repairs using pre-impregnated materials may follow a similar cure cycle with the substitution of a 430° F. three-hour hold in place of the 550° F. hold. In all cases, the preferred temperature rise rate between each of the holds is about 5° F. per minute for temperatures below 400° F. and about 3° F. per minute for temperatures above 400° F.

The previously described method of the present invention has many advantages. The method is useful in repairing high temperature composite structures, wherein temperatures of between 650° F. and 750° F. dictate that the repair installations are fully restored to their original performance requirements. The present method is particularly applicable to repairing components fabricated from AFR-700B resin systems.

The integration of resistivity plies into the repair method, using the templates and shaping procedures previously described, may be included as appropriate to the component under repair. Additionally, although the repair designs described herein were sized from one to five inches, using the method of the present invention, repairs may be scaled up to many feet in size. The repair method may be applied in either the production or maintenance environment.

Although the present invention has been described in considerable detail with reference to certain preferred versions thereof, other versions are possible without departing from the spirit and scope of the present invention. For example, the steps of preparing the templates and preparing the skin plies may be accomplished irrespective of the other steps as long as the plies are available for installation. Additionally, while the method has been illustrated for use with high temperature materials (i.e., between 650–750° F.), the method may also be useful with lower temperature materials, such as PMR-15, which has a temperature range of about 450–600° F. Therefore the appended claims should not be limited to the description of the preferred versions contained herein.

We claim:

1. A method for repairing a composite component fabricated from a high temperature material, said component comprising an internal core and a skin surface comprising a plurality of composite plies, said component having a damaged region therein, the method comprising the steps of:
   (a) preparing a plurality of repair plies corresponding to the composite plies of the component for installing into the damaged region;
   (b) preparing a plurality of templates for sizing and placing the plurality of repair plies;
   (c) installing a core block into the damaged region,
   (d) bonding the core block in place by applying high temperature material resin, which comprises about 50% wt. polyimide resin blended with methanol and n-methyl-2-pyrrolidinone at a ratio of about 8:1, and uncured foam material into the region between the core block and the damaged region;
   (e) partially curing the core block to restore the internal core of the composite component;
   (f) installing the plurality of repair plies, using the templates for positioning, to repair the structural integrity of the composite component; and
   (g) curing the damaged region of the composite component.

2. The method of claim 1, wherein the repair plies comprise high temperature pre-impregnated repair plies.

3. The method of claim 1, wherein the repair plies comprise dry cloth manually impregnated with high temperature resin.

4. The method of claim 3 further comprising the step of partially curing the high temperature repair plies before installing.

5. The method of claim 1, wherein the repair plies further comprise resistivity plies for repairing the electrical integrity of the component.

6. The method of claim 5 further comprising the step of partially curing the resistivity plies to improve handling and the electrical integrity of the damaged region.

7. The method of claim 1, wherein the step of partially curing the core block comprises the step of heating the core block to a temperature of 430° F. for three hours.

8. The method of claim 1, wherein the curing step (g) comprises:
   (1) placing a plurality of release materials over the damaged region of the composite component with the repair plies installed, wherein the plurality of release materials comprises one or more plies of fabric coated with polytetrafluoroethylene and a nonporous perforated release ply;
   (2) placing an aluminum caul sheet over the release materials for ensuring even heat distribution and a smooth surface finish;
   (3) placing a heating blanket over the caul sheet for heating the repair plies;
   (4) placing insulation over the heating blanket; and
   (5) securing a high temperature vacuum bag material over the insulation for allowing the pressure surrounding the installed repair plies to be increased.

9. The method of claim 1, wherein the repair plies comprise dry cloth manually impregnated with high temperature resin and wherein the curing step (g) comprises:
   (1) heating the damaged region with the repair plies installed therein for about two hours at a temperature of about 150° F.;
   (2) heating the damaged region with the repair plies installed therein for about two hours at a temperature of about 180° F.;
   (3) heating the damaged region with the repair plies installed therein for about two hours at a temperature of about 200° F.;
   (4) heating the damaged region with the repair plies installed therein for about 30 minutes at a temperature of about 550° F.;
   (5) heating the damaged region with the repair plies installed therein for about four hours at a temperature of about 700° F.; and
   (6) heating the damaged region with the repair plies installed therein for about eight hours at a temperature of about 750° F.

10. The method of claim 1, wherein the repair plies comprise pre-impregnated plies and wherein the curing step (g) comprises:
    (1) heating the damaged region with the repair plies installed therein for about two hours at a temperature of about 150° F.;
    (2) heating the damaged region with the repair plies installed therein for about two hours at a temperature of about 180° F.;
    (3) heating the damaged region with the repair plies installed therein for about two hours at a temperature of about 200° F.;
    (4) heating the damaged region with the repair plies installed therein for about 3 hours at a temperature of about 430° F.;
    (5) heating the damaged region with the repair plies installed therein for about four hours at a temperature of about 700° F.; and
    (6) heating the damaged region with the repair plies installed therein for about eight hours at a temperature of about 750° F.

11. A method for repairing a composite component fabricated from a high temperature material, said component comprising a plurality of composite plies and having a damaged region therein, the method comprising the steps of:

(a) preparing a plurality of repair plies corresponding to the composite plies of the component for installing into the damaged region, the repair plies comprising resistivity plies selected ensure the electrical integrity of the component by matching the resistive taper of the resistivity plies to the resistive taper of the damaged region;

(b) preparing a plurality of templates for sizing and placing the plurality of repair plies;

(c) installing the plurality of repair plies, using the templates for positioning, to repair the structural integrity of the composite component;

(d) partially curing the resistivity plies to improve handling and the electrical integrity of the damaged region; and (e) curing the damaged region of the composite component.

12. The method of claim 11, wherein the repair plies further comprise high temperature pre-impregnated repair plies.

13. The method of claim 11, wherein the repair plies further comprise dry cloth manually impregnated with high temperature resin.

14. The method of claim 13 further comprising the step of partially curing the high temperature repair plies before installing.

15. The method of claim 11, wherein the curing step (e) comprises:

(1) placing a plurality of release materials over the damaged region of the composite component with the repair plies installed, wherein the plurality of release materials comprise one or more plies of fabric coated with polytetrafluoroethylene and a nonporous perforated release ply;

(2) placing an aluminum caul sheet over the release materials for ensuring even heat distribution and a smooth surface finish;

(3) placing a heating blanket over the caul sheet for heating the repair plies;

(4) placing insulation over the heating blanket; and (5) securing a high temperature vacuum bag material over the insulation for allowing the pressure surrounding the installed repair plies to be increased.

16. The method of claim 11, wherein the repair plies comprise dry cloth manually impregnated with high temperature resin and wherein the curing step (e) comprises:

(1) heating the damaged region with the repair plies installed therein for about two hours at a temperature of about 150° F.;

(2) heating the damaged region with the repair plies installed therein for about two hours at a temperature of about 180° F.;

(3) heating the damaged region with the repair plies installed therein for about two hours at a temperature of about 200° F.;

(4) heating the damaged region with the repair plies installed therein for about 30 minutes at a temperature of about 550° F;

(5) heating the damaged region with the repair plies installed therein for about four hours at a temperature of about 700° F.; and (6) heating the damaged region with the repair plies installed therein for about eight hours at a temperature of about 750° F.

17. The method of claim 11, wherein the repair plies comprise pre-impregnated plies and wherein the curing step (e) comprises:

(1) heating the damaged region with the repair plies installed therein for about two hours at a temperature of about 150° F.;

(2) heating the damaged region with the repair plies installed therein for about two hours at a temperature of about 180° F.;

(3) heating the damaged region with the repair plies installed therein for about two hours at a temperature of about 200° F.;

(4) heating the damaged region with the repair plies installed therein for about 3 hours at a temperature of about 430° F.;

(5) heating the damaged region with the repair plies installed therein for about four hours at a temperature of about 700° F.; and (6) heating the damaged region with the repair plies installed therein for about eight hours at a temperature of about 750° F.

18. A method for repairing a composite component fabricated from a high temperature material, said component comprising an internal core and a skin surface comprising a plurality of composite plies, said component having a damaged region therein, the method comprising the steps of:

(a) preparing a plurality of repair plies corresponding to the composite plies of the component for installing into the damaged region, wherein the repair plies comprise resistivity plies selected ensure the electrical integrity of the component by matching the resistive taper of the resistivity plies to the resistive taper of the damaged region;

(b) preparing a plurality of templates for sizing and placing the plurality of repair plies;

(c) restoring the internal core of the composite component;

(d) installing the plurality of repair plies, using the templates for positioning, to repair the structural integrity of the composite component;

(e) partially curing the resistivity plies to improve handling and the electrical integrity of the damaged region; and (f) curing the damaged region of the composite component.

19. The method of claim 18 further comprising the steps of:

(1) installing a core block into the damaged region;

(2) bonding the core block in place by applying high temperature material resin, which comprises about 50% wt. polyimide resin blended with methanol and n-methyl-2-pyrrolidinone at a ratio of about 8:1, and uncured foam material into the region between the core block and the damaged region; and (3) partially curing the core block to restore the internal core of the composite component.

* * * * *